United States Patent
Conway (10) Patent No.: US 11,449,077 B2
(45) Date of Patent: Sep. 20, 2022

(54) METHOD AND COMPUTING SYSTEM FOR IDENTIFYING INCORRECT AIRCRAFT ALIGNMENT

(71) Applicant: THE BOEING COMPANY, Chicago, IL (US)

(72) Inventor: Sheila Ruth Conway, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 154 days.

(21) Appl. No.: 16/714,239

(22) Filed: Dec. 13, 2019

(65) Prior Publication Data

US 2021/0181764 A1 Jun. 17, 2021

(51) Int. Cl.
*G05D 1/06* (2006.01)
*G08G 5/00* (2006.01)
*G08G 5/02* (2006.01)

(52) U.S. Cl.
CPC ......... *G05D 1/0676* (2013.01); *G08G 5/0013* (2013.01); *G08G 5/025* (2013.01)

(58) Field of Classification Search
CPC ..... G05D 1/0676; G08G 5/0013; G08G 5/025
See application file for complete search history.

(56) References Cited

U.S. PATENT DOCUMENTS

| | | | |
|---|---|---|---|
| 6,606,563 B2 * | 8/2003 | Corcoran, III | G01S 19/17 340/435 |
| 6,950,037 B1 | 9/2005 | Clavier et al. | |
| 8,731,810 B2 | 5/2014 | Conway | |
| 9,443,433 B1 | 9/2016 | Conway et al. | |
| 9,818,305 B2 | 11/2017 | Conway | |

(Continued)

FOREIGN PATENT DOCUMENTS

| | | |
|---|---|---|
| EP | 2259245 A2 | 12/2010 |
| EP | 2649603 B1 | 3/2015 |

(Continued)

OTHER PUBLICATIONS

EP Application No. 20212844, European Search Report dated May 6, 2021.

(Continued)

*Primary Examiner* — Nicholas Kiswanto
(74) *Attorney, Agent, or Firm* — Alston & Bird LLP (57) ABSTRACT

A method, computing system and computer program product are provided to identify the alignment of an aircraft with an incorrect surface, such as a taxiway or a runway that is closed or unsuited for current conditions. In a method, the trajectory of an aircraft approaching an airport is determined. Based upon the trajectory and information regarding a configuration of the airport, the method determines whether the aircraft is approaching the incorrect surface. If the aircraft is approaching the incorrect surface, the method interacts via an interface to cause an alert to be issued. If the aircraft is approaching a correct surface, the method determines whether the trajectory of the aircraft is consistent with predefined procedures of the airport. If the trajectory of the aircraft is inconsistent with predefined procedures of the airport, the method interacts via the interface to cause the alert to be issued.

20 Claims, 5 Drawing Sheets

(56) References Cited

U.S. PATENT DOCUMENTS

| | | |
|---|---|---|
| 10,043,405 B1* | 8/2018 | Chartier .............. G08G 5/0021 |
| 2004/0167685 A1 | 8/2004 | Ryan et al. |
| 2005/0015202 A1* | 1/2005 | Poe ..................... G08G 5/0008 |
| | | 701/301 |
| 2008/0109163 A1 | 5/2008 | Stone et al. |
| 2010/0191450 A1* | 7/2010 | Ravenscroft ........... G08G 5/065 |
| | | 701/120 |
| 2011/0037616 A1* | 2/2011 | Leutelt ................... G08G 5/065 |
| | | 340/901 |
| 2014/0062729 A1 | 3/2014 | Conner et al. |
| 2016/0093302 A1* | 3/2016 | Bilek ..................... G10L 15/22 |
| | | 704/235 |
| 2017/0036776 A1 | 2/2017 | He |
| 2018/0061243 A1* | 3/2018 | Shloosh .............. G08G 5/0091 |

FOREIGN PATENT DOCUMENTS

| | | |
|---|---|---|
| EP | 2919219 A1 | 9/2015 |
| EP | 3144922 A1 | 3/2017 |
| EP | 3540713 A1 | 9/2019 |
| EP | 3564924 A1 | 11/2019 |
| WO | WO 2012/078231 A1 | 6/2012 |

OTHER PUBLICATIONS

EP Application No. 20212844.3, extended European Search Report and Written Opinion dated May 19, 2021.

\* cited by examiner

METHOD AND COMPUTING SYSTEM FOR IDENTIFYING INCORRECT AIRCRAFT ALIGNMENT

TECHNOLOGICAL FIELD

An example embodiment of the present disclosure relates to an analysis of the manner in which an aircraft approaches an airport and, more particularly, to the identification of the alignment of the aircraft with an incorrect surface of the airport.

BACKGROUND

Airports have many different surfaces on which an aircraft may potentially land or at least attempt to land. Only some of these surfaces of an airport are actually designed and in an operational state to receive an aircraft that is landing at the airport. Other surfaces of an airport are not designed and/or are not in an operational state to support the landing of an aircraft thereupon. For example, the runway to which the aircraft is directed upon its approach to the airport is configured for the aircraft to safely land thereupon. In this regard, the runway is appropriately sized relative to the aircraft and the runway has been cleared of other aircraft and equipment such that the aircraft can safely land upon the runway. However, other runways of the airport may be too small, e.g. too short, for the aircraft to land thereupon, while other runways of the airport many be closed or otherwise undergoing maintenance and, as a result, may not be in condition for the aircraft to land thereupon. Other surfaces of the airport include, for example, taxiways that are not designed or maintained in an operational state to receive an aircraft landing thereupon. For example, although a taxiway may extend in parallel alongside a runway, the taxiway may be too small to safely receive an aircraft landing thereupon and/or other aircraft or other equipment may be positioned along the taxiway that would impede any effort by an aircraft to land thereupon.

Although numerous issues are potentially created in an instance in which an aircraft lands upon an incorrect surface at an airport, current equipment and procedures are not always able to avoid such an incident. For example, air traffic controllers may not always have sufficient information regarding the current location and intended path of an aircraft to determine that the aircraft is approaching an incorrect surface as opposed to the intended runway upon which the aircraft is to land. For example, an air traffic controller may not have sufficient information to determine that an aircraft is aligned with a taxiway that extends in parallel to the runway on which the aircraft is intended to land. In this regard, radar systems that are relied upon by air traffic controllers may not provide information with sufficient precision regarding the current location of an aircraft and the intended path of the aircraft in order to reliably distinguish between the alignment of an aircraft with the runway on which the aircraft is to land and an incorrect surface at the airport. Consequently, a variety of issues may be created in an instance in which an aircraft lands upon an incorrect surface due to, for example, the size of the incorrect surface and/or other aircraft or equipment on the incorrect surface.

BRIEF SUMMARY

A method, computing system and computer program product are provided in accordance with an example embodiment in order to identify the alignment of an aircraft with an incorrect surface. As a result, the method, computing system and computer program product of an example embodiment may cause an alert to be issued in an effort to cause the aircraft to be diverted from the incorrect surface and to be aligned, instead, with the intended runway. In this manner, the aircraft has an increased likelihood to land upon the intended runway and, as a result, to make an uneventful landing, thereby increasing the reliability with which aircraft land on the intended runways.

In an example embodiment, a method is provided for identifying alignment of an aircraft with an incorrect surface, such as a taxiway, a runway that is closed and/or a runway that is unsuited for current conditions. The method includes determining a trajectory of the aircraft approaching an airport. Based upon the trajectory and information regarding a configuration of the airport, the method determines, with processing circuitry, whether the aircraft is approaching the incorrect surface. In an instance in which the aircraft is approaching the incorrect surface, the method interacts via an interface in order to cause an alert to be issued. In an instance in which the aircraft is approaching a correct surface, the method determines, with the processing circuitry, whether the trajectory of the aircraft is consistent with predefined procedures of the airport. In an instance in which the trajectory of the aircraft is inconsistent with predefined procedures of the airport, the method interacts via the interface in order to cause the alert to be issued.

The method of an example embodiment also includes receiving a command from air traffic control. The method of this example embodiment determines whether the command conflicts with the information regarding the configuration of the airport or the predefined procedures of the airport. In an instance in which the command is determined to conflict, the method of this example embodiment further includes ceasing further determinations based upon the information regarding the configuration of the airport or the predefined procedures of the airport. In an instance in which the command that is received is verbal, the method of this example embodiment further includes converting the verbal command to a computer-readable form prior to determining whether the command conflicts.

The method of an example embodiment determines whether the aircraft is approaching an incorrect surface by determining, in an instance in which the aircraft is initially determined to be approaching the incorrect surface based upon information provided by flight management computer or an autopilot system, whether the aircraft is intended to remain on approach to the incorrect surface or to transition so as to no longer approach the incorrect surface. In this example embodiment, the method interacts via the interface to cause the alert to be issued in the instance in which the aircraft is approaching the incorrect surface in a manner that is dependent upon the aircraft planning to remain on approach to the incorrect surface.

In another example embodiment, a computing system is provided for identifying alignment of an aircraft with an incorrect surface, such as a taxiway, a runway that is closed and/or a runway that is unsuited for current conditions. The computing system includes processing circuitry configured to determine the trajectory of an aircraft approaching the airport and, based upon the trajectory and information regarding a configuration of the airport, to determine whether the aircraft is approaching the incorrect surface. In an instance in which the aircraft is approaching the incorrect surface, the processing circuitry is configured to interact via an interface to cause an alert to be issued. In an instance in which the aircraft is approaching a correct surface, the processing circuitry is configured to determine whether the trajectory of the aircraft is consistent with predefined procedures of the airport. In an instance in which the trajectory of the aircraft is inconsistent with predefined procedures of the airport, the processing circuitry is configured to interact via the interface to cause the alert to be issued.

The processing circuitry of an example embodiment is further configured to receive a command from air traffic control and to determine whether the command conflicts with the information regarding the configuration of the airport or the predefined procedures of the airport. The processing circuitry of this example embodiment is configured, in an instance in which the command is determined to conflict, to cease further determinations based upon the information regarding the configuration of the airport or the predefined procedures of the airport. In an embodiment in which the command that is received is verbal, the processing circuitry is further configured to convert the verbal command to a computer-readable form prior to determining whether the command conflicts.

The processing circuitry of an example embodiment is configured to determine whether the aircraft is approaching the incorrect surface by determining, in an instance in which the aircraft is initially determined to be approaching the incorrect surface and based upon the information provided by a flight management computer or an autopilot system, whether the aircraft is planning to remain on approach to the incorrect surface or to transition so as to no longer approach the incorrect surface. The processing circuitry of this example embodiment is configured to interact via the interface in order to cause the alert to be issued in the instance in which the aircraft is approaching the incorrect surface in a manner that is dependent upon the aircraft planning to remain on approach to the incorrect surface.

In a further example embodiment, a computer program product is provided for identifying alignment of an aircraft with an incorrect surface, such as a taxiway, a runway that is closed and/or a runway that is unsuited for current conditions. The computer program product includes at least one non-transitory computer-readable storage medium having computer-executable computer program code instructions stored therein with the computer-executable program code instructions including program code instructions configured to determine a trajectory of the aircraft approaching an airport. The computer-executable program code instructions also include program code instructions configured to determine, based upon the trajectory and information regarding a configuration of the airport, whether the aircraft is approaching the incorrect surface. In an instance in which the aircraft is approaching the incorrect surface, the computer-executable program code instructions also include program code instructions configured to interact via an interface to cause an alert to be issued. In an instance in which the aircraft is approaching a correct surface, the computer-executable program code instructions are further configured to determine whether the trajectory of the aircraft is consistent with predefined producers of the airport. In an instance in which the trajectory of the aircraft is inconsistent with predefined procedures of the airport, the computer-executable program code instructions further include program code instructions configured to interact via the interface in order to cause the alert to be issued.

The computer-executable program code instructions of an example embodiment also include program code instructions configured to receive a command from air traffic control and program code instructions configured to determine whether the command conflicts with the information regarding the configuration to the airport or the predefined procedures of the airport. In an instance in which the command is determined to conflict, the computer-executable program code instructions further include program code instructions configured to cease further determinations based upon the information regarding the configuration of the airport or predefined procedures of the airport. In an instance in which the command that is received is verbal, the computer-executable program code instructions further include program code instructions configured to convert the verbal command to a computer-readable form prior to determining whether the command conflicts.

The program code instructions of an example embodiment that are configured to determine whether the aircraft is approaching the incorrect surface include program code instructions configured to determine, in an instance in which the aircraft is initially determined to be approaching the incorrect surface and based upon the information provided by flight management computer or autopilot system, whether the aircraft is planning to remain on approach to the incorrect surface or to transition so as to no longer approach the incorrect surface. In this example embodiment, the program code instructions configured to interact via the interface in order to cause the alert to be issued in the instance in which the aircraft is approaching the incorrect surface are dependent upon the aircraft planning to remain on approach to the incorrect surface.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

An airport oftentimes includes a plurality of different surfaces, only some of which are configured at any particular point in time for an aircraft to land upon. As a result, a method, computing system and computer program product are provided in accordance with an example embodiment in order to identify the alignment of an aircraft, such as an aircraft approaching an airport, with an incorrect surface, that is, a surface that is unsuited for the aircraft to land upon or a surface (suitable or not) that is different than the runway upon which the aircraft is intended to land. In an instance in which the alignment of the aircraft with an incorrect surface is identified, an alert may be issued, such as to the pilot or other onboard personnel, to an air traffic controller or other offboard personnel, to a flight management system, to an autopilot system or the like. Based upon alert, the flight path of the aircraft may be modified so as to no longer be in alignment with the incorrect surface and to, instead, be aligned with the correct surface, such as the runway, on with the aircraft intends to land. Consequently, the method, computing system and computer program product of an example embodiment improve the reliability with which aircraft land upon the correct surface at an airport.

Figure 1:
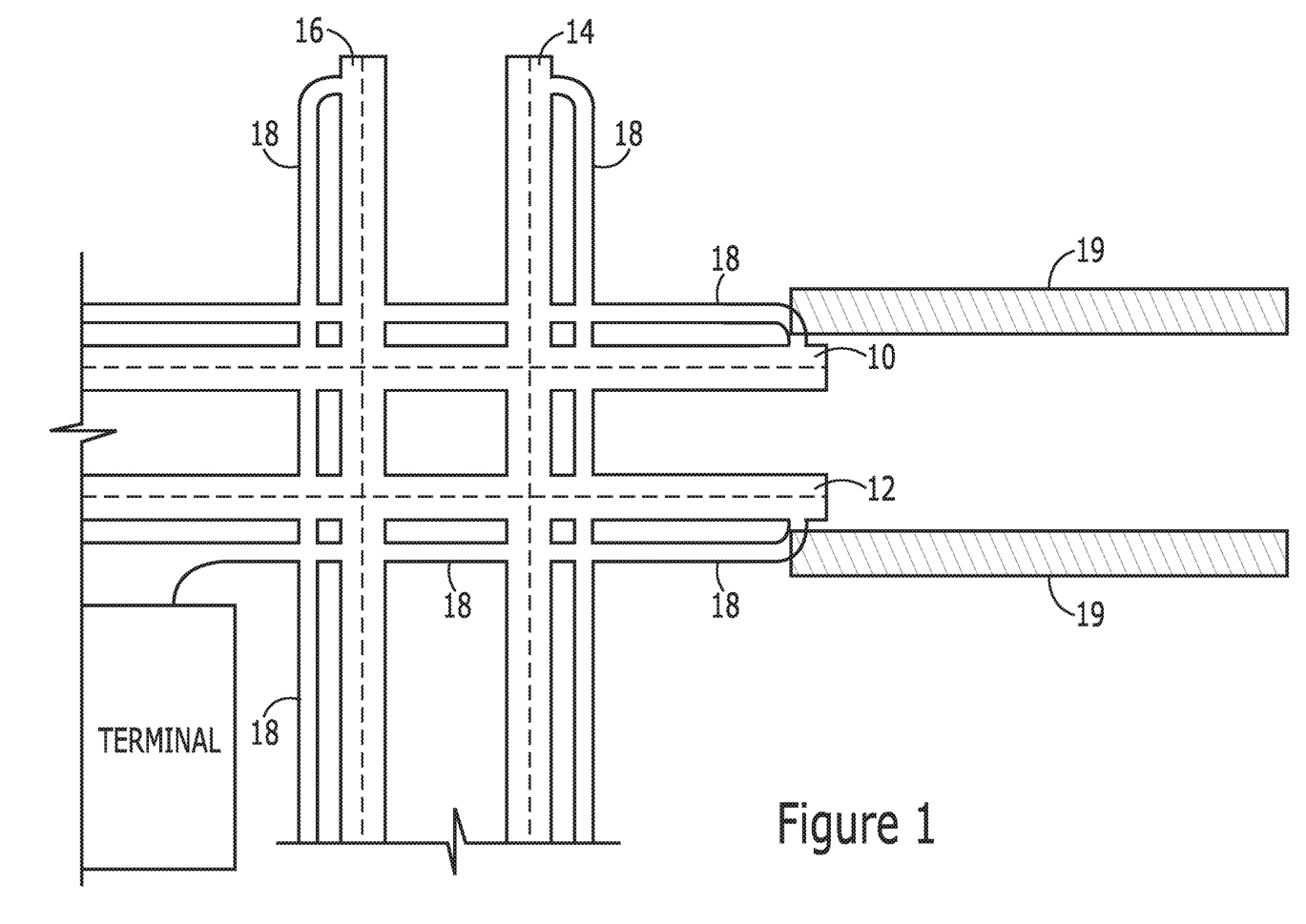
FIG. 1 is a plan view of a portion of an airport including a plurality of runways and taxiways.

By way of example of the various surfaces of an airport upon which an aircraft could potentially land, FIG. 1 depicts a portion of an airport. In this example, the airport includes two parallel runways 10, 12 extending left to right and two parallel runways 14, 16 extending from top to bottom. Of these runways of the example of FIG. 1, runways 10, 12 and 14 are in service, while runway 16 is undergoing maintenance and is not in service. Additionally, other surfaces of the airport include taxiways 18 that extend generally alongside respective runways and are configured to support aircraft taxing between a respective runway and the terminal or another runway. The taxiways 18 also support the movement of other types of equipment about the airport with the equipment being, on some occasions, temporarily parked on a taxiway As noted above, a computing system 20 is provided in accordance with an example embodiment in order to identify alignment of an aircraft with an incorrect surface of an airport. Although the computing system 20 may be embodied by any of a variety of different types of computers, the computing system of an example embodiment is embodied by a server, a personal computer, a computer workstation, a flight management computer, an autopilot system, an air traffic control ground station, an air traffic control radar system or the like.

Figure 2:
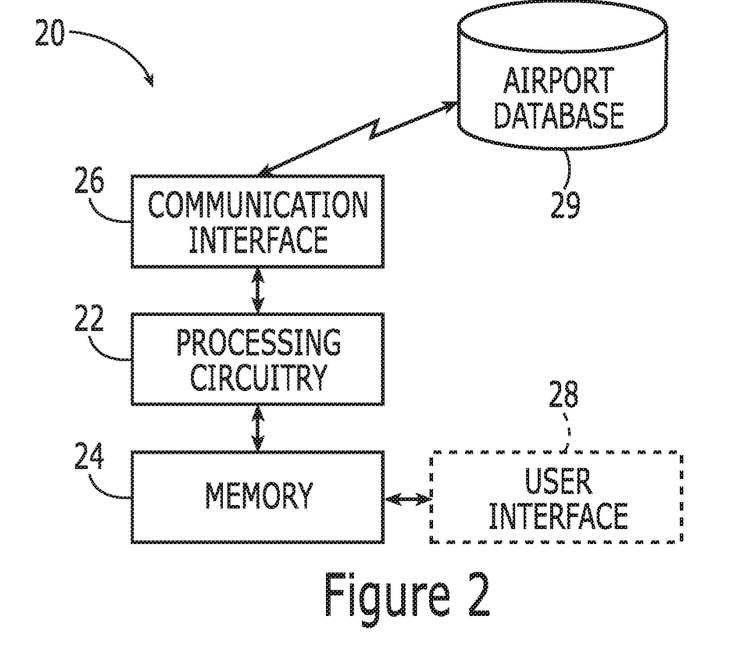
FIG. 2 is a block diagram of a computing system that may be specifically configured in accordance with an example embodiment in order to identify the alignment of an aircraft with an incorrect surface.

Regardless of the manner in which the computing system 20 is embodied, the computing system of an example embodiment or is otherwise associated with a processing circuitry 22, memory 24, a communication interface 26 and an option user interface 28. The processing circuitry 22 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 22 is configured to execute instructions stored in the memory 24 or otherwise accessible to the processing circuitry. These instructions, when executed by the processing circuitry 22, may cause the computing system 20 to perform one or more of the functionalities described herein. As such, the computing system 20 may comprise an entity capable of performing operations according to embodiments of the present disclosure while configured accordingly. Thus, for example, when the processing circuitry 22 is embodied as an ASIC, FPGA or the like, the processing circuitry and, correspondingly, the computing system 20 may comprise specifically configured hardware for conducting one or more operations described herein. Alternatively, as another example, when the processing circuitry 22 is embodied as an executor of instructions, such as may be stored in the memory 24, the instructions may specifically configure the processing circuitry and, in turn, the computing system 20 to perform one or more algorithms and operations described herein.

The memory 24 may include, for example, non-volatile memory. The memory 24 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 24 may comprise any non-transitory computer readable storage medium. The memory 24 may be configured to store information, data, applications, instructions, or the like for enabling the computing system 20 to carry out various functions in accordance with example embodiments of the present disclosure. For example, the memory 24 may be configured to store program instructions for execution by the processing circuitry 22.

The communication interface 26 may be in communication with the processing circuitry 22 and the memory 24 and may be configured to receive and/or transmit data, such as described below. The communication interface 26 may include, for example, one or more antennas and supporting hardware and/or software for enabling communications with a wireless communication network. Additionally or alternatively, the communication interface 26 may include the circuitry for interacting with the antenna(s) to cause transmission of signals via the antenna(s) or to handle receipt of signals received via the antenna(s). In some environments, the communication interface 26 may alternatively or also support wired communication.

If the computing system 20 includes a user interface 28, the user interface may be in communication with the processing circuitry 22 and the memory 24 to receive an indication of a user input and/or to provide an audible, visual, mechanical, or other output to a user. As such, the user interface may include, for example, a display and one or more speakers for providing visual and audible output to a user. Other examples of the user interface include a keyboard, a mouse, a joystick, a microphone and/or other input/output mechanisms.

Figure 3:
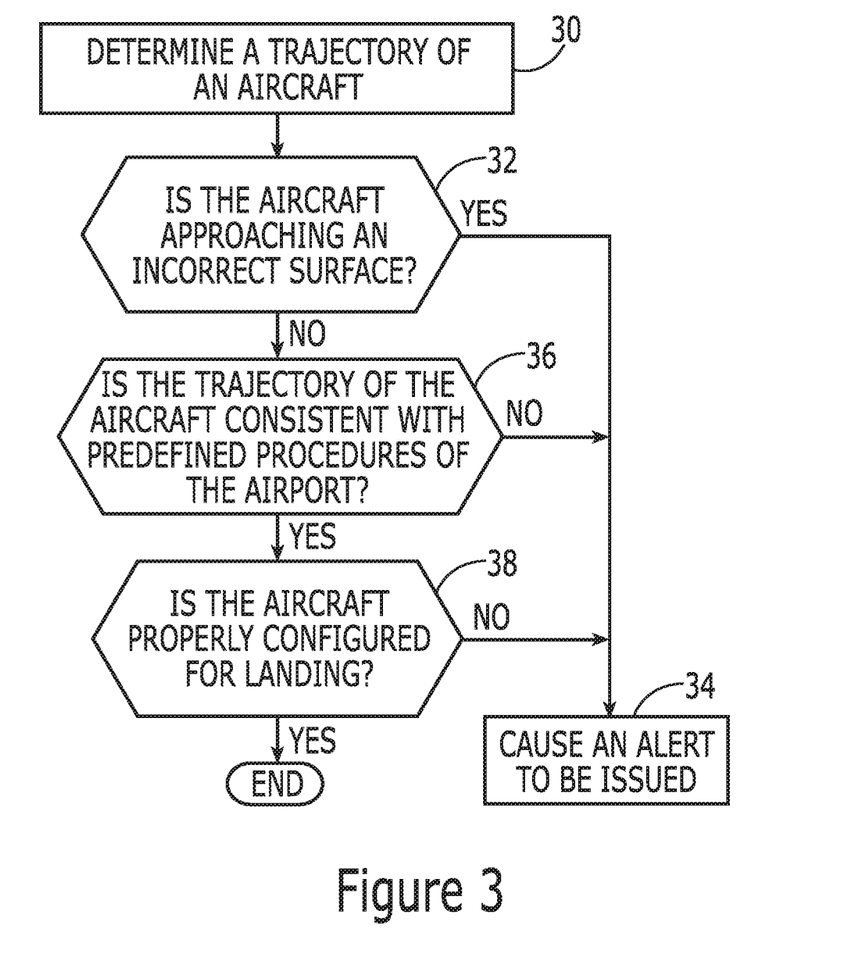
FIG. 3 is a flowchart illustrating the operations performed, such as by the computing system of FIG. 2, in order to identify the alignment of an aircraft with an incorrect surface in accordance with an example embodiment.

The operations performed, such as by the computing system 20, in accordance with an example embodiment are depicted in FIG. 3. As shown in block 30 of FIG. 3, the computing system 20, such as the processing circuitry 22, is configured to determine the trajectory of the aircraft approaching the airport. The trajectory of the aircraft may be determined in various manners. For example, a flight management computer, such as a flight control system, or an autopilot system may provide information to the computing system 20 defining the trajectory of the aircraft as the aircraft approaches the airport. Alternatively, the computing system 20, such as the processing circuitry 22, may be configured to determine the trajectory of the aircraft based upon location information defining the position of the aircraft at different points in time, such as may be provided by a Global Positioning System (GPS) or a Wide Area Augmentation System (WAAS). In this regard, the advent and mandate for high precision onboard surveillance with GPS and/or WAAS augmentation enables the trajectory of an aircraft to be determined with much greater precision at more substantial distances from an airport, such that the computing system 20 of an example embodiment may determine the alignment of an aircraft with an incorrect surface also at a greater distance from the airport and over a wider area than a traditional instrument approach path, thereby permitting an alert to be provided sufficiently in advance that an aircraft may safely avoid landing upon an incorrect surface.

The computing system 20, such as the processing circuitry 22, also has access to information regarding the configuration of the airport. For example, information regarding the configuration of the airport may be stored by an airport database 29 with which the computing system 20 is in communication, such as via the communication interface 26. Alternatively, the information regarding the configuration of the airport may be stored by the memory 24 of the computing system 20. The information regarding the configuration of the airport includes information regarding the various surfaces of the airport, such as the runways, taxiways, etc. The information regarding the various surfaces of the airport defines the respective locations and sizes of the surfaces including a definition of the center line of each surface (as shown in dashed lines in FIG. 1), information regarding the state of the various surfaces, such as operational, undergoing maintenance, out of service, etc. and information defining the various conditions under which an aircraft may land upon a respective surface, such as limitations upon the size and or weight of an aircraft that may land upon a surface, limitations upon the speed with which an aircraft that lands upon the respective surface may be traveling, limitations on the trajectory of an aircraft that is approaching the respective surface, limitations regarding wind or other weather conditions that must exist (or must not exist) in order for an aircraft to land upon the respective surface or the like. The information regarding the configuration of the airport may be updated, such as by updating the airport database 29 and/or the memory 24. For example, the information regarding the configuration of the airport may be updated in real-time or near-real-time in some embodiments.

Based upon the trajectory of the aircraft and the information regarding the configuration of the airport, the computing system 20, such as the processing circuitry 22, is configured to determine whether the aircraft is approaching the incorrect surface. See block 32 of FIG. 3. In this regard, the processing circuitry 22 may be configured to determine whether the trajectory of the aircraft is aligned with the incorrect surface. The alignment of the trajectory of an aircraft with an incorrect surface may be determined in various manners. In one embodiment, however, the processing circuitry 22 is configured to determine that the trajectory of an aircraft is aligned with an incorrect surface in an instance in which an aircraft that is within a predefined range of the airport has a trajectory that: (i) extends generally in parallel with a center line of the incorrect surface, such as by being angularly offset from the center line of the incorrect surface by no more than a predefined angular amount, and (ii) is laterally offset from the centerline of the incorrect surface by no more than a predefined amount, such as a predefined percentage of the width on the incorrect surface. By way of example, FIG. 1 depicts taxiway alignment regions 19 extending outward from each of two different taxiways 18. As will be noted, the taxiway alignment regions 19 are aligned with the respective taxiways 18 and have widths at least as large and, in the illustrated embodiment, larger than the widths of the respective taxiways. In an instance in which the trajectory of an aircraft that is within the predefined range of the airport lies within a respective taxiway alignment region, the computing system 20, such as the processing circuitry 22, is configured to determine that the trajectory of the aircraft is approaching an incorrect surface.

Of the various surfaces of an airport, certain ones of these surfaces may be considered to be an incorrect surface. As opposed to surfaces of an airport that are designed for and in an operational state to receive an aircraft that is landing at the airport, incorrect surfaces of an airport are not designed for and/or are not in an operational state to support the landing of an aircraft thereupon. A taxiway is an example of an incorrect surface as a taxiway is not designed or maintained in an operational state to receive an aircraft landing thereupon. Similarly, a runway that is closed is another example of an incorrect surface since an aircraft approaching the airport should not land upon a runway that is closed. Additionally, in an embodiment in which the information regarding the configuration of the airport defines the conditions under which a runway is available for an aircraft to land thereupon, a runway may be an incorrect surface in an instance in which the current conditions do not satisfy the conditions under which a runway is available for landing of an aircraft. In this regard, a runway may be unsuited for the current conditions for various reasons including weather conditions that make the runway unsuitable and/or the size, type, or speed of the aircraft approaching the airport that make the runway unsuitable. Although examples of incorrect surfaces are provided herein, the incorrect surfaces may be an surface that is not designed for and/or is not in an operational state to support the landing of an aircraft, such as any surface other than those surfaces of an airport that have been designed for and are in an operational state to receive an aircraft.

In an instance in which the aircraft is determined to be approaching an incorrect surface, the computing system 20, such as the processing circuitry 22, is configured to interact via an interface in order to cause an alert to be issued. See block 34 of FIG. 3. Depending upon the configuration, the computing system 20 may issue various alerts to one or more recipients. For example, the computing system 20, such as the processing circuitry 22, may be configured to cause an alert to be issued via a user interface 28 onboard the aircraft in order to alert a pilot or other onboard personnel as to the approach of the aircraft to an incorrect surface and the need to redirect the aircraft. Additionally or alternatively, the computing system 20, such as the processing circuitry 22, may be configured to cause an alert to be issued via the communication interface 26 to a user interface offboard the aircraft, such as a user interface of an air traffic control center, in order to alert the air traffic controllers as to the approach of the aircraft to an incorrect surface and the need to redirect the aircraft. In an instance in which the flight of the aircraft is controlled or assisted in an automated manner, such as by flight management computer, an autopilot system or the like, the computing system 20, such as the processing circuitry 22, may be configured to interact via the communication interface 26 with the flight management computer, the autopilot system or the like which, in turn, may be configured to recognize the approach of the aircraft to the incorrect surface and to redirect the aircraft. As a result of the alert provided in accordance with an example embodiment, the aircraft may be safely redirected in any of the foregoing scenarios so as to no longer approach the incorrect surface, but to, instead, approach the intended runway upon which the aircraft is to land.

Figure 4:
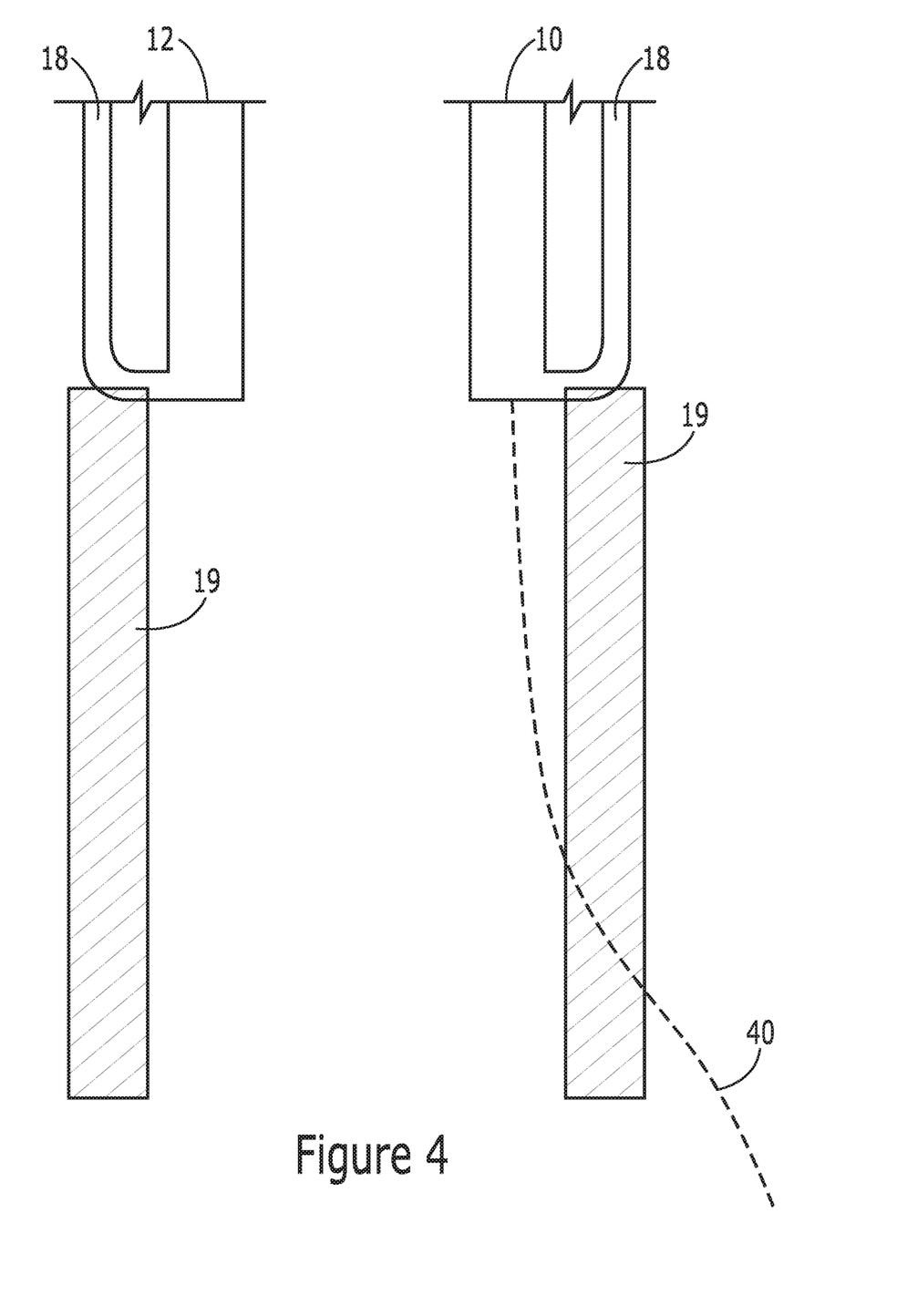
FIG. 4 depicts the flight path of an aircraft that is in transition so as to only temporarily be aligned with an incorrect surface.

In an example embodiment, the computing system 20, such as the processing circuitry 22, is configured to determine whether the aircraft is approaching the incorrect surface by taking into account the intended route of the aircraft and making a determination as to whether the intended route remains on approach to the incorrect surface or is merely transitioning, such as into alignment with the correct runway, so as to no longer approach the incorrect surface following the transition. In this example embodiment, and in an instance in which the aircraft is initially determined to be approaching the incorrect surface, the computing system 20, such as the processing circuitry 22, is configured to determine, such as based upon information provided by a flight management computer or an autopilot system, whether the aircraft is planning to remain on approach to the incorrect surface or to transition so as to no longer approach the incorrect surface. In this regard, the computing system 20, such as the processing circuitry 22, may be configured to evaluate the intended flight path of the aircraft relative to the incorrect surface and, more particularly, relative to a region extending outward from and in alignment with the incorrect surface, such as the taxiway alignment regions 19 in FIG. 1. In an instance in which the intended flight path of the aircraft, such as defined by the flight management computer or the autopilot system, remains within the region that it is aligned with and extends outwardly from the incorrect surface during the approach of the aircraft to the airport, the computing system 20, such as the processing circuitry 22, is configured to determine that the aircraft is planning to remain on approach to the incorrect surface. However, as shown in FIG. 4, the intended flight path 40 of the aircraft may, in other instances, pass through the region 19 that is aligned with and extends outwardly from the incorrect surface. In the example depicted in FIG. 4, the intended flight path of the aircraft does not continue to lie within the region that is aligned with and extends outwardly from the incorrect surface as the aircraft approaches the airport and, instead, transitions therethrough to a different airspace, such as into alignment with the runway upon which the aircraft is to land.

In this example embodiment, the computing system 20, such as the processing circuitry 22, is configured to interact via the interface to cause the alert to be issued in the instance in which the aircraft is approaching the incorrect surface in a manner that is dependent upon the aircraft planning to remain on approach to the incorrect surface. Thus, in an instance in which the aircraft plans to remain on approach to the incorrect surface, an alert is issued. However, even in an instance in which the aircraft is initially determined to be approaching the incorrect surface, the determination that the aircraft plans to transition so as to no longer approach the incorrect surface prevents the computing system 20, such as the processing circuitry 22, from causing the alert to be issued. Thus, the merely temporary alignment of an aircraft with an incorrect surface during, for example, transition of the aircraft to a flight path that is no longer aligned with the incorrect surface will not cause an alert to be issued, thereby avoiding nuisance alerts that may otherwise diminish the credibility of the other alerts that are issued.

In an instance in which the aircraft is approaching a correct surface, such as the runway on which the aircraft is intended to land, the computing system 20, such as the processing circuitry 22, is also configured to determine whether the trajectory of the aircraft is consistent with predefined procedures of the airport. See block 36 of FIG. 3. In this regard, the predefined procedures of the airport may be stored by the airport database 29 or by the memory 24. The predefined procedures of the airport may define various parameters that govern proper landings upon a runway of the airport. These procedures may include information regarding the range of speeds with which different types of aircraft may approach the runway, the rate of descent of an aircraft upon approach to the runway, the trajectory of the aircraft to follow in order to properly land upon the runway, etc.

In this example embodiment, the computing system 20, such as the processing circuitry 22, receives information regarding various operational parameters of the aircraft, such as from the aircraft, e.g., from a flight management computer, an autopilot system or the like. These operational parameters may include, for example, the speed of the aircraft, the rate of descent of the aircraft, the trajectory of the aircraft, e.g., the accuracy with which the trajectory of the aircraft must be aligned with the central axis of a runway, etc. The computing system 20, such as the processing circuitry 22, of this example embodiment is configured to compares the operational parameters, including the trajectory of the aircraft, with the predefined procedures of the airport in order to determine whether the operational parameters of the aircraft are consistent with and satisfy the predefined procedures of the airport.

In an instance in which the operational parameters including the trajectory of the aircraft are consistent with the predefined procedures of the airport, the computing system 20 may take no further action such that the aircraft may proceed to land upon the intended runway. However, in an instance in which the operational parameters including the trajectory of the aircraft are inconsistent with and fail to satisfy one or more of the predefined procedures of the airport, the computing system 20, such as the processing circuitry 22, is configured to interact via the interface in order to cause an alert to be issued. See block 34 of FIG. 3. Depending upon the configuration, the computing system 20 may issue various alerts to one or more recipients. For example, the computing system 20, such as the processing circuitry 22, may be configured to cause an alert to be issued via the user interface 28 onboard the aircraft in order to alert a pilot or other onboard personnel as to the violation of the predefined procedures of the airport. Additionally or alternatively, the computing system 20, such as the processing circuitry 22, may be configured to cause an alert to be issued via the communication interface 26 to a user interface offboard the aircraft, such as a user interface of an air traffic control center, in order to alert the air traffic controllers as to the violation of the predefined procedures of the airport. In an instance in which the flight of the aircraft is controlled or assisted in an automated manner, such as by flight management computer, an autopilot system or the like, the computing system 20, such as the processing circuitry 22, may be configured to interact via the communication interface 26 with the flight management computer, the autopilot system or the like to advise as to the violation of the predefined procedures of the airport.

Based upon the alert, the trajectory of the aircraft may be modified, such as by the pilot, by the flight management computer or autopilot system, in response to direction from an air traffic controller or the like, such that the trajectory of the aircraft, as modified, becomes consistent with the predefined procedures of the airport and the aircraft can proceed to land upon the intended runway. Alternatively, the aircraft may be redirected, such as to circle the airport and begin the approach to the correct surface again, albeit with a trajectory that is consistent on this approach with the predefined procedures of the airport.

In some embodiments, the computing system 20, such as the processing circuitry 22, is also configured to determine whether the aircraft is properly configured for landing. In this regard, the computing system 20, such as the processing circuitry 22, receives information from the aircraft, such as a flight management computer, an autopilot system or the like, and determines, from this information, whether the aircraft is properly configured for landing. See block 38 of FIG. 3. Although various parameters may be considered in conjunction with the determination as to whether the aircraft is properly configured for landing, the computing system 20, such as the processing circuitry 22, of an example embodiment is configured to determine whether the landing gear has been extended and to determine that the aircraft is properly configured for landing in an instance in which the landing gear has been extended, but to determine that the aircraft is not configured for landing in an instance in which the landing gear has not been extended. In an instance in which the computing system 20, such as the processing circuitry 22, determines that the aircraft is properly configured for landing, such as by having the landing gear extended, the computing system may take no further action such that the aircraft may proceed to land upon the intended runway. However, in an instance in which the computing system 20, such as the processing circuitry 22, determines that the aircraft is not properly configured for landing, such as by not having the landing gear extended, the computing system, such as the processing circuitry, is configured to interact via the interface in order to cause an alert to be issued. Se block 34 of FIG. 3. Depending upon the configuration, the computing system 20 may issue various alerts to one or more recipients, such as the pilot or other onboard personnel via the user interface 28, an air traffic controller or other offboard personnel via the communication interface 26 or an automated control system, such as a flight management computer, an autopilot system or the like, via the communication system in the manner described above in conjunction with other types of alerts.

The computing system 20, such as the processing circuitry 22, may be triggered to identify the alignment of an aircraft with an incorrect surface of an airport in various manners. For example, the computing system 20, such as the processing circuitry 22, may be triggered manually, such as by a pilot of the aircraft, by an air traffic controller or otherwise. Alternatively, the computing system 20, such as the processing circuitry 22, may be triggered to identify the alignment of the aircraft with an incorrect surface in an automated manner, such as in an instance in which the computing system, such as a processing circuitry, determines that a predefined trigger condition is satisfied, such as the aircraft being within a predefined range of the airport or the receipt of information via a datalink or other non-verbal forms of communication that indicates that the aircraft is preparing to land. Still further, the computing system, such as the processing circuitry, may be triggered to identify alignment of the aircraft with an incorrect surface based upon one or more other conditions associated with the aircraft, such as based upon the extension of the landing gear.

Once the computing system 20 has been triggered to identify the alignment of an aircraft with an incorrect surface of an airport, the computing system, such as the processing circuitry 22, may then also proceed to determine whether the trajectory of the aircraft is consistent with predefined procedures of the airport and/or whether the aircraft is properly configured for landing in an instance in which the aircraft is determined to be approaching a correct surface, such as the intended runway. However, the computing system 20, such as the processing circuitry 22, may be triggered to determine whether the trajectory of the aircraft is consistent with predefined procedures of the airport and/or whether the aircraft is properly configured for landing in other manners, such as manually or in an automated manner upon the satisfaction of a predefined trigger condition, such as the aircraft coming within a predefined range of the airport.

As described above, the determination as to whether an aircraft is approaching the incorrect surface and whether the trajectory of the aircraft is consistent with predefined procedures of the airport may be dependent in some embodiments upon the availability of an airport database 29 containing information regarding the configuration of the airport and the predefined procedures of the airport. In these embodiments and in an instance in which the airport database in unavailable, the computing system 20, such as the processing circuitry 22, may be configured to provide an alert, such as to the pilot, to an aircraft traffic controller or otherwise, as to the unavailability of the airport database and, as a result, of the resulting inability to identify the alignment of the aircraft with an incorrect surface of the airport.

Figure 5:
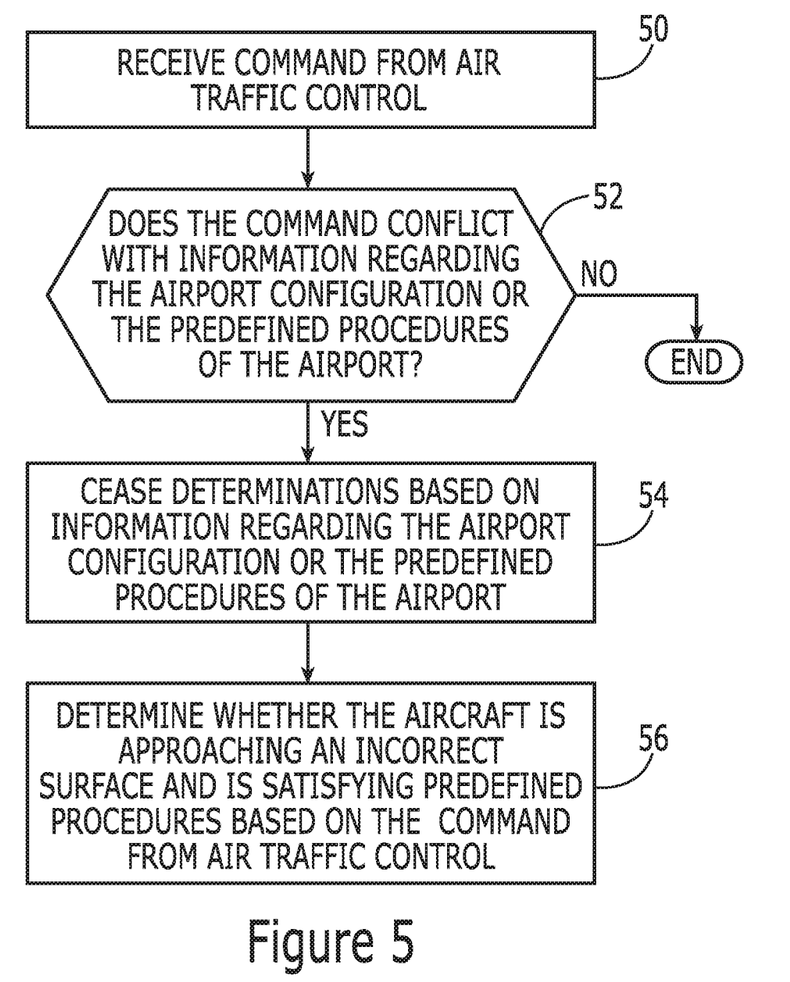
FIG. 5 is a flowchart illustrating operations performed, such as by the computing system of FIG. 2, in order to prioritize a command from air traffic control in accordance with an example embodiment of the present disclosure.

In some embodiments, the aircraft may receive commands from air traffic control with at least some of these commands being of greater priority than the steps taken to identify alignment of the aircraft with an incorrect surface, such as depicted in FIG. 3. In this example embodiment as depicted in FIG. 5, the computing system 20, such as the processing circuitry 22, the communication interface 26 or the like, is configured to receive a command from air traffic control. See block 50. In some embodiments, the command that is received from air traffic control is verbal. In this instance, the computing system 20, such as the processing circuitry 22, is configured to convert the verbal command to a computer-readable form prior to determining whether the command conflicts with the information regarding the configuration of the airport or the predefined procedures of the airport.

The computing system 20, such as the processing circuitry 22, of this example embodiment is configured to determine whether the command conflicts with the information regarding the configuration of the airport or the predefined procedures of the airport, such as may be provided by the airport database 29. See block 52 of FIG. 5. For example, the command from air traffic control may indicate that a runway that was identified to be open and in service by the airport database is currently out of service. Or, the command from the air traffic control may indicate than an aircraft approaching a certain runway must approach with a different range of speeds than those identified by the predefined procedures of the airport in relation to the same runway. In an instance in which the command is determined to conflict, such as in a manner described above, the computing system 20, such as the processing circuitry 22, is configured to cease further determinations based upon the information regarding the configuration of the airport or the predefined procedures of the airport. See block 54. Thus, in this example embodiment, the computing system 20, such as the processing circuitry 22, is configured to no longer determine whether the approach of the aircraft is consistent with the configuration of the airport or the predefined procedures of the airport, but to, instead, determine whether the approach of the aircraft is consistent with the updated information provided by the command from air traffic control. See block 56. In an instance in which the command from air traffic control conflicts with the information regarding the configuration of the airport or the predefined procedures of the airport, an alert of such conflict may be provided in the same manner as described above with respect to other alerts, such as to the pilot, to air traffic control, to the flight management system or the autopilot system, or the like.

A method, computing system 20 and computer program product are therefore provided in order to identify the alignment of an aircraft with an incorrect surface. As a result, the method, computing system 20 and computer program product of an example embodiment may cause an alert to be issued in an effort to cause the aircraft to be diverted from the incorrect surface and to be aligned, instead, with the intended runway. In this manner, the aircraft has an increased likelihood to land upon the intended runway and, as a result, to make an uneventful landing, thereby increasing the reliability with which aircraft land on the intended runways. Moreover, the method, computing system 20 and computer program product of an example embodiment may leverage the high precision onboard surveillance coupled with GPS and/or WAAS augmentation to determine the trajectory of an aircraft with much greater precision at more substantial distances from an airport, such that the alignment of an aircraft with an incorrect surface may also be identified at a greater distance from the airport and over a wider area than a traditional instrument approach path, thereby permitting an alert to be provided sufficiently in advance that an aircraft may safely avoid landing upon an incorrect surface.

As described above, FIGS. 3 and 5 illustrate flowcharts of a computing system 20, method, and computer program product according to example embodiments of the present disclosure. It will be understood that each block of the flowcharts, and combinations of blocks in the flowcharts, may be implemented by various means, such as hardware and/or a computer program product comprising one or more computer-readable storage mediums having computer readable program instructions stored thereon. For example, one or more of the procedures described herein may be embodied by computer program instructions of a computer program product. In this regard, the computer program product(s) which embody the procedures described herein may be stored by one or more memory devices 24 of a computing system 20 and executed by a processing circuitry 22 of the computing system. In some embodiments, the computer program instructions comprising the computer program product(s) which embody the procedures described above may be stored by a plurality of memory devices 24. As will be appreciated, any such computer program product may be loaded onto a computer or other programmable apparatus to produce a machine, such that the computer program product including the instructions which execute on the computer or other programmable apparatus creates means for implementing the functions specified in the flowchart blocks. Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart blocks. The computer program instructions of one or more computer program products may also be loaded onto the computing system or other programmable apparatus to cause a series of operations to be performed on the computing system or other programmable apparatus to produce a computer-implemented process such that the instructions which execute on the computing system or other programmable apparatus implement the functions specified in the flowchart blocks.

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program products.

The above described functions may be carried out in many ways. For example, any suitable means for carrying out each of the functions described above may be employed to carry out embodiments of the present disclosure. In one embodiment, a suitably configured computing system 20 may provide all or a portion of the elements of the present disclosure. In another embodiment, all or a portion of the elements may be configured by and operate under control of a computer program product. The computer program product for performing the methods of embodiments of the present disclosure includes a computer-readable storage medium, such as the non-volatile storage medium, and computer-readable program code portions, such as a series of computer instructions, embodied in the computer-readable storage medium.

Many modifications and other aspects of the disclosure set forth herein will come to mind to one skilled in the art to which this disclosure pertains having the benefit of the teachings presented in the foregoing descriptions and the associated drawings. For example, although some embodiments are described above that involve communication with an air traffic controller, other embodiments are not dependent upon clearance from or other communication with the air traffic controller and may, instead, identify the alignment of an aircraft that is preparing to land with any incorrect surface regardless of whether the aircraft has received clearance from the air traffic controller. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method for identifying alignment of an aircraft with an incorrect surface, the method implemented by a computing system embodied by a flight management computer, an autopilot system, an air traffic control ground station or an air traffic control radar system, the method comprising:
   determining a trajectory of the aircraft approaching an airport;
   based upon the trajectory and information regarding a configuration of the airport, determining, with processing circuitry, whether the aircraft is approaching the incorrect surface;
   in an instance in which the aircraft is approaching the incorrect surface, interacting via an interface in order to cause an alert to be issued;
   in an instance in which the aircraft is approaching a correct surface, determining, with the processing circuitry, whether the trajectory of the aircraft is consistent with predefined procedures of the airport;
   in an instance in which the trajectory of the aircraft is inconsistent with the predefined procedures of the airport, interacting via the interface in order to cause the alert to be issued,
   wherein determining whether the aircraft is approaching the incorrect surface comprises evaluating an intended flight path of the aircraft, in an instance in which the aircraft is initially determined to be approaching the incorrect surface and based upon an evaluation of information provided by the flight management computer or the autopilot system that defines the intended flight path of the aircraft, to determine whether an intended route of the aircraft remains on approach to the incorrect surface or transitions so as to no longer approach the incorrect surface, and wherein interacting via the interface to cause the alert to be issued in the instance in which the aircraft is approaching the incorrect surface is dependent upon the intended route of the aircraft remaining on approach to the incorrect surface;

receiving a command from air traffic control that is of greater priority than determining whether the aircraft is approaching the incorrect surface;

determining whether the command conflicts with the information provided by an airport database regarding the configuration of the airport or the predefined procedures of the airport; and in an instance in which the command is determined to conflict, ceasing further determinations based upon the information regarding the configuration of the airport or the predefined procedures of the airport and determining instead whether the trajectory of the aircraft is consistent with updated information provided by the command.

2. A method according to claim 1 wherein the command that is received is verbal, and wherein the method further comprises converting the verbal command to a computer-readable form prior to determining whether the command conflicts.

3. A method according to claim 1 wherein the incorrect surface comprises a taxiway.

4. A method according to claim 1 wherein the incorrect surface comprises a runway that is closed.

5. A method according to claim 1 wherein the incorrect surface comprises a runway that is unsuited for current conditions.

6. A method according to claim 1 wherein evaluating the intended flight path of the aircraft comprises:

determining that the intended route of the aircraft remains on approach to the incorrect surface in an instance in which the intended flight path remains within a region extending outward from and in alignment with the incorrect surface; and determining that the intended route of the aircraft transitions so as to no longer approach the incorrect surface in an instance in which the intended flight path transitions through the region extending outward from and in alignment with the incorrect surface and into a different airspace.

7. A method according to claim 1 further comprises triggering determination as to whether the aircraft is approaching the incorrect surface upon receipt of information indicating that the aircraft is preparing to land or one or more conditions associated with the aircraft.

8. A computing system for identifying alignment of an aircraft with an incorrect surface, the computing system embodied by a flight management computer, an autopilot system, an air traffic control ground station or an air traffic control radar system, the computing system comprising processing circuitry configured to:

determine a trajectory of the aircraft approaching an airport;

based upon the trajectory and information regarding a configuration of the airport, determine whether the aircraft is approaching the incorrect surface;

in an instance in which the aircraft is approaching the incorrect surface, interact via an interface to cause an alert to be issued;

in an instance in which the aircraft is approaching a correct surface, determine whether the trajectory of the aircraft is consistent with predefined procedures of the airport; and in an instance in which the trajectory of the aircraft is inconsistent with predefined procedures of the airport, interact via the interface to cause an alert to be issued, wherein the processing circuitry is configured to determine whether the aircraft is approaching the incorrect surface by evaluating an intended flight path of the aircraft, in an instance in which the aircraft is initially determined to be approaching the incorrect surface and based upon an evaluation of information provided by the flight management computer or the autopilot system that defines the intended flight path of the aircraft, to determine whether an intended route of the aircraft remains on approach to the incorrect surface or transitions so as to no longer approach the incorrect surface, and wherein the processing circuitry is configured to interact via the interface to cause the alert to be issued in the instance in which the aircraft is approaching the incorrect surface is dependent upon the intended route of the aircraft remaining on approach to the incorrect surface;

receive a command from air traffic control that is of greater priority than determining whether the aircraft is approaching the incorrect surface;

determine whether the command conflicts with the information provided by an airport database regarding the configuration of the airport or the predefined procedures of the airport; and in an instance in which the command is determined to conflict, cease further determinations based upon the information regarding the configuration of the airport or the predefined procedures of the airport and determine instead whether the trajectory of the aircraft is consistent with updated information provided by the command.

9. A computing system according to claim 8 wherein the command that is received is verbal, and wherein the processing circuitry is further configured to convert the verbal command to a computer-readable form prior to determining whether the command conflicts.

10. A computing system according to claim 8 wherein the incorrect surface comprises a taxiway.

11. A computing system according to claim 8 wherein the incorrect surface comprises a runway that is closed.

12. A computing system according to claim 8 wherein the incorrect surface comprises a runway that is unsuited for current conditions.

13. A computing system according to claim 8 wherein the processing circuitry is configured to evaluate the intended flight path of the aircraft by:

determining that the intended route of the aircraft remains on approach to the incorrect surface in an instance in which the intended flight path remains within a region extending outward from and in alignment with the incorrect surface; and determining that the intended route of the aircraft transitions so as to no longer approach the incorrect surface in an instance in which the intended flight path transitions through the region extending outward from and in alignment with the incorrect surface and into a different airspace.

14. A computing system according to claim 8 wherein the processing circuitry is further configured to trigger determination as to whether the aircraft is approaching the incorrect surface upon receipt of information indicating that the aircraft is preparing to land or one or more conditions associated with the aircraft.

15. A computer program product of a computing system embodied by a flight management computer, an autopilot system, an air traffic control ground station or an air traffic control radar system, the computer program product configured to identify alignment of an aircraft with an incorrect surface, the computer program product comprising at least one non-transitory computer-readable storage medium having computer-executable program code instructions stored therein, the computer-executable program code instructions comprising program code instructions configured to:
  determine a trajectory of the aircraft approaching an airport;
  based upon the trajectory and information regarding a configuration of the airport, determine whether the aircraft is approaching the incorrect surface;
  in an instance in which the aircraft is approaching the incorrect surface, interact via an interface in order to cause an alert to be issued;
  in an instance in which the aircraft is approaching a correct surface, determine whether the trajectory of the aircraft is consistent with predefined procedures of the airport; and
  in an instance in which the trajectory of the aircraft is inconsistent with predefined procedures of the airport, interact via the interface in order to cause an alert to be issued,
  wherein the program code instructions configured to determine whether the aircraft is approaching the incorrect surface comprise program code instructions configured to evaluate an intended flight path of the aircraft, in an instance in which the aircraft is initially determined to be approaching the incorrect surface and based upon an evaluation of information provided by the flight management computer or the autopilot system that defines the intended flight path of the aircraft, to determine whether an intended route of the aircraft remains on approach to the incorrect surface or transitions so as to no longer approach the incorrect surface, and wherein the program code instructions configured to interact via the interface to cause the alert to be issued in the instance in which the aircraft is approaching the incorrect surface are dependent upon the intended route of the aircraft remaining on approach to the incorrect surface;
  receive a command from air traffic control that is of greater priority than determining whether the aircraft is approaching the incorrect surface;
  determine whether the command conflicts with the information provided by an airport database regarding the configuration of the airport or the predefined procedures of the airport; and
  in an instance in which the command is determined to conflict, cease further determinations based upon the information regarding the configuration of the airport or the predefined procedures of the airport and determine instead whether the trajectory of the aircraft is consistent with updated information provided by the command.

16. A computer program product according to claim 15 wherein the command that is received is verbal, and wherein the computer-executable program code instructions further comprise program code instructions configured to convert the verbal command to a computer-readable form prior to determining whether the command conflicts.

17. A computer program product according to claim 15 wherein the incorrect surface comprises a taxiway.

18. A computer program product according to claim 15 wherein the incorrect surface comprises a runway that is closed or a runway that is unsuited for current conditions.

19. A computer program product according to claim 1 wherein the program code instructions configured to evaluate the intended flight path of the aircraft comprise program code instructions configured to:
  determine that the intended route of the aircraft remains on approach to the incorrect surface in an instance in which the intended flight path remains within a region extending outward from and in alignment with the incorrect surface; and
  determine that the intended route of the aircraft transitions so as to no longer approach the incorrect surface in an instance in which the intended flight path transitions through the region extending outward from and in alignment with the incorrect surface and into a different airspace.

20. A computer program product according to claim 15 wherein the computer-executable program code instructions further comprise program code instructions configured to trigger determination as to whether the aircraft is approaching the incorrect surface upon receipt of information indicating that the aircraft is preparing to land or one or more conditions associated with the aircraft.

* * * * *

UNITED STATES PATENT AND TRADEMARK OFFICE
CERTIFICATE OF CORRECTION

PATENT NO. : 11,449,077 B2  
APPLICATION NO. : 16/714239  
DATED : September 20, 2022  
INVENTOR(S) : Conway Page 1 of 1

It is certified that error appears in the above-identified patent and that said Letters Patent is hereby corrected as shown below:

In the Claims

Column 16,
Line 10, "airport; and" should read --airport;--.

Column 17,
Line 32, "airport; and" should read --airport;--.

Column 18,
Line 28, "claim 1" should read --claim 15--.

Signed and Sealed this
Twenty-second Day of August, 2023

Katherine Kelly Vidal
*Director of the United States Patent and Trademark Office*